United States Patent

[11] 3,603,175

| [72] | Inventor | Peter Horton<br>Luton, England |
|---|---|---|
| [21] | Appl. No. | 859,863 |
| [22] | Filed | Sept. 22, 1969 |
| [45] | Patented | Sept. 7, 1971 |
| [73] | Assignee | The English Electric Company Limited<br>London, England |
| [32] | Priority | Sept. 20, 1968 |
| [33] | | Great Britain |
| [31] | | 44725/68 |

[54] PLURAL DRIVE CLUTCHES WITH AUTOMATIC LOCK
5 Claims, 5 Drawing Figs.

[52] U.S. Cl. ................................................ 74/625, 192/48.91, 192/114
[51] Int. Cl. ................................................ F16d 21/04
[50] Field of Search ........................................... 192/114, 48.91, 53.7; 74/625

[56] References Cited
UNITED STATES PATENTS
| 1,683,693 | 9/1928 | O'Sullivan ................. | 192/114 |
| 2,232,584 | 2/1941 | Aitken ..................... | 192/114 X |
| 3,234,818 | 2/1966 | Cantalupo et al ............ | 74/625 |
| 3,257,866 | 6/1966 | Fry ........................ | 74/625 |
| 3,515,250 | 6/1970 | Cantalupo .................. | 192/114 X |

*Primary Examiner*—Benjamin W. Wyche
*Attorneys*—Misegades and Douglas, Keith Misegades and George R. Douglas, Jr.

ABSTRACT: This invention relates to an actuator having a clutch control mechanism arranged to set the actuator in a position in which it is driven by a motor via a worm wheel or in a manually driven position. The clutch control mechanism includes a yoke which is manually moved by a lever to urge the clutch member into the manual drive position. The yoke is locked in this position by a latch which bears against a rod attached to the yoke. In this position the latch also bears against the worm wheel and is rotated when the latter is motor-driven. Rotation of the latch allows the rod to drop into a hole in the latch and the clutch member moves into engagement with the worm wheel. Rotation of the worm wheel therefore automatically changes the actuator from manual drive to motor drive.

3,603,175

PLURAL DRIVE CLUTCHES WITH AUTOMATIC LOCK

This invention relates to actuators capable of manual or motor-powered operation.

According to the invention, an actuator includes a clutch member arranged to drive an output member and movable axially between first and second operating positions in which it engages, respectively, a motor-driven rotatable member and a manual drive member; means to urge the clutch member into said first position; clutch-operating means to move the clutch member from said first position into said second position; and a latch member which is pivoted about an axis substantially parallel to the axis of rotation of the motor-driven member and is urged into a latching position in which it latches the clutch member in said second position, said latch member being rotated about its pivot axis, when the motor-driven member rotates, to allow the clutch member to return to said first position.

Embodiments of the invention will now be described with reference to the accompanying drawings, in which.

Figure 1:
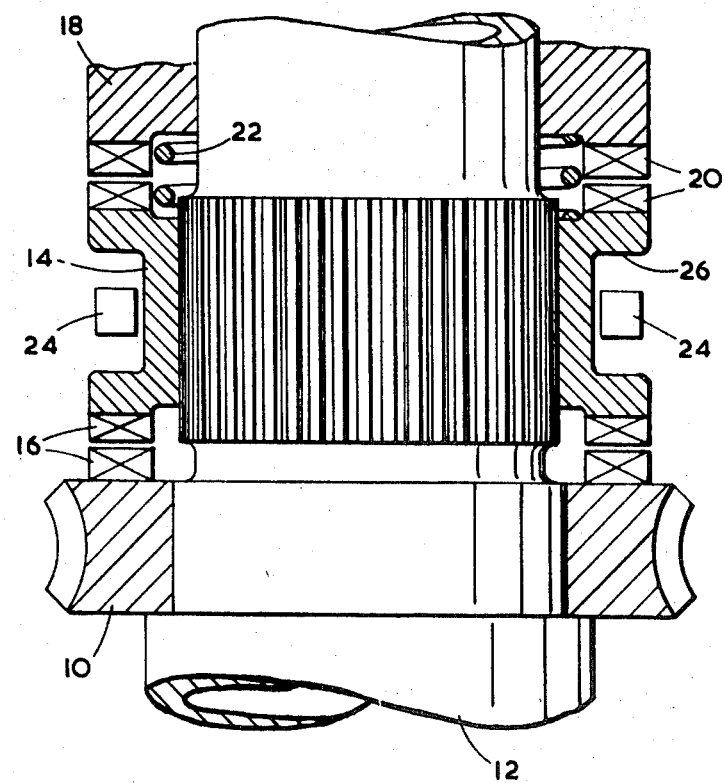
FIG. 1 is a partly sectioned side view of part of an actuator.

Referring to FIG. 1, the actuator includes a worm wheel 10 which is driven by a worm (not shown). The wheel 10 surrounds a hollow output shaft 12 which contains a nut (not shown) to engage a threaded spindle, for example controlling a valve.

A clutch member 14 has a spline connection with the shaft 12 and can move axially between two positions in which it receives a drive either from the worm wheel 10, through dogs 16 or from a manual driving member 18, through dogs 20. The clutch member is urged downwards towards the motor-driving position by a spring 22.

Figure 2:
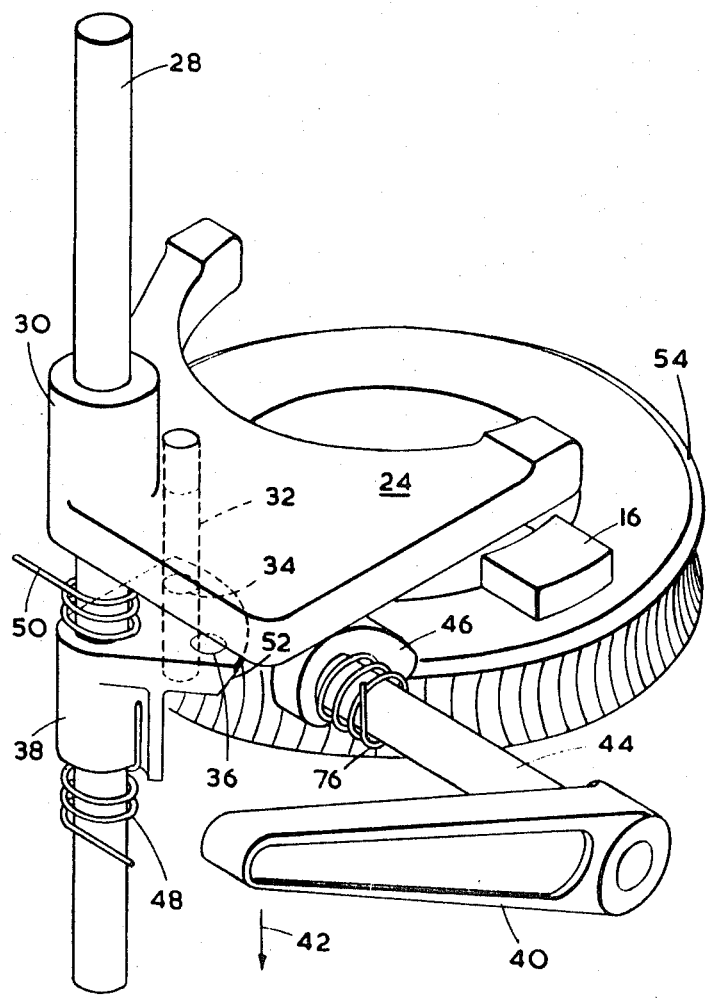
FIG. 2 is a perspective view showing parts of a clutch control arrangement, the arrangement being shown in a motor-driving position.

Referring also to FIG. 2, the clutch control mechanism includes a yoke member 24 which engages below a shoulder 26 (FIG. 1) on the clutch member. A vertical post 28 passes through a bush 30 in the yoke member 24 and enables the yoke member to slide vertically. When the yoke member is in the motor-driving position, a vertical stop pin 32 attached to the yoke member 24 passes through one of two holes 34 or 36 in a latch member 38 which is also vertically slidable on the post 28.

Figure 3:
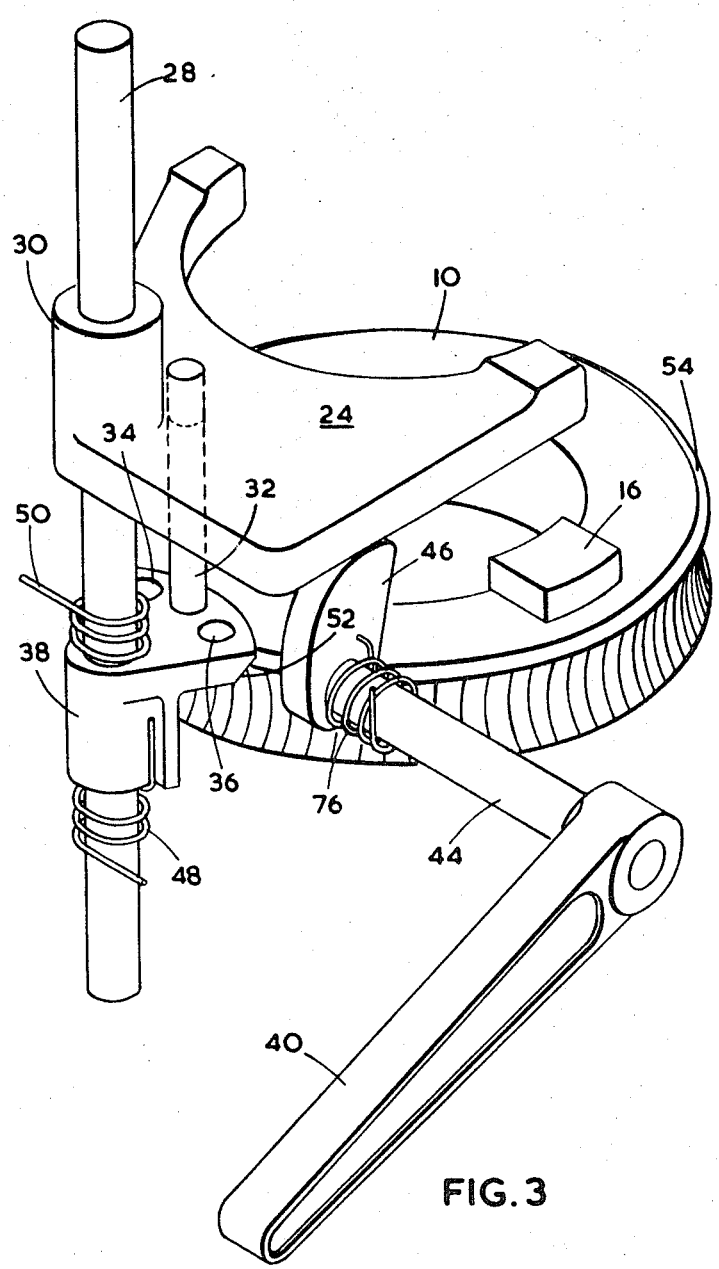
FIG. 3 is similar to FIG. 2, but shows the arrangement in a manual driving position.

In order to move the clutch member 14 into engagement with the manual driving member, a lever 40 is moved in the direction of the arrow 42 against the action of a returning torsional spring 76. The lever is mounted on a spindle 44 which carries a cam 46 engaging the underside of the yoke member 24. It will be seen that downward movement of the lever 40 in the direction of the arrow 42 produces anticlockwise movement of the cam 46 which therefore lifts the yoke member, and the yoke member in turn lifts the clutch member. As soon as the pin 32 leaves the hole in the latch member 38, one of two torsional springs 48 or 50 returns the latch member to a central position in which the axis of the pin 32 lies approximately midway between the holes 34 and 36 as shown in FIG. 3. Accordingly, the lever 42 can be released and the yoke member 24 will be held up by the engagement of the pin 32 on the latch 38.

The actuator cannot be returned manually to the motor-driving position. It returns automatically as soon as the motor is started. This automatic return is brought about by the engagement of a bevelled surface 52 on the latch with a corresponding bevelled surface 54 on the worm wheel 10. This engagement produces a frictional drive rotating the latch in one or other direction about the post 28 (depending upon the direction of rotation of the actuator motor) until the latch reaches a position in which the pin 32 on the yoke member can drop into one of the holes 34 or 36, whereupon the yoke member 24 drops under the action of the spring 22 (and against the slight lifting action produced by the spring 48) and allows the clutch member 26 to move under the action of its spring 22 into engagement with the worm wheel.

Figure 4:
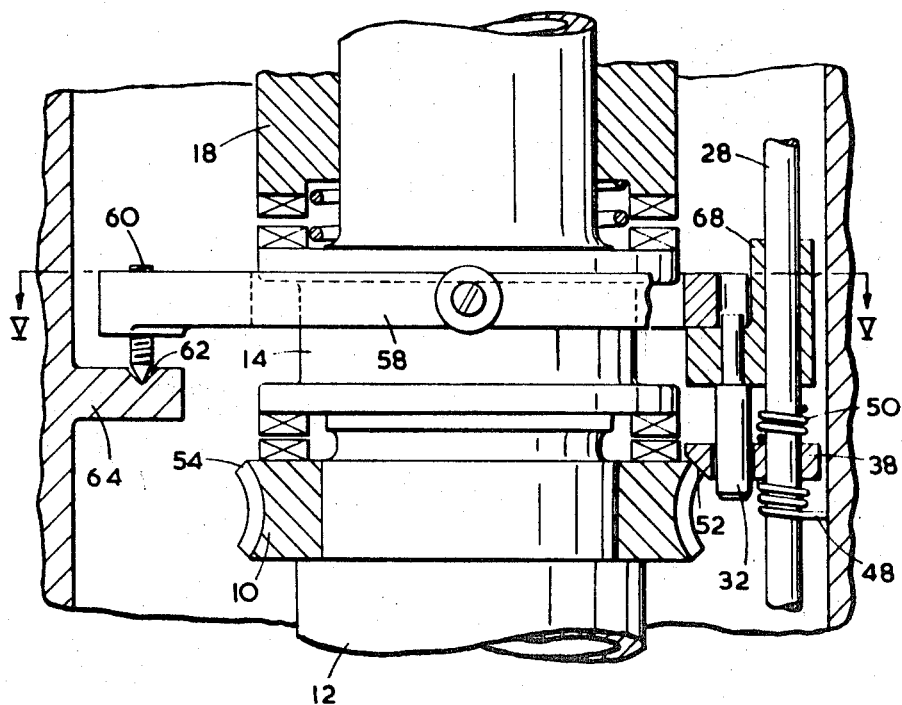
FIG. 4 is a partly sectioned side view of part of a different actuator.
Figure 5:
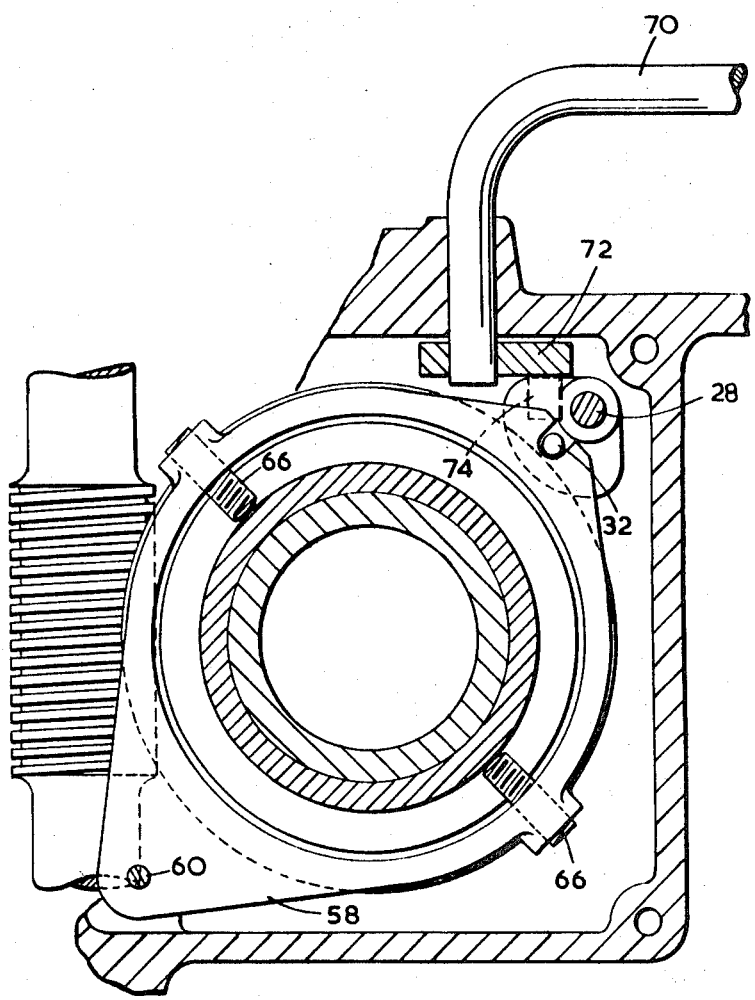
FIG. 5 is a section on line V—V of FIG. 4.

FIGS. 4 and 5 show a different form of clutch mechanism with a built-in mechanical advantage. This arrangement is more suitable for larger actuators.

Similar parts have the same reference numerals as in FIGS. 1 to 3. In particular, the motor-driven worm wheel 10, the clutch member 14, the manual drive member 18 and the post 28 with its latch member 38 are similar to the equivalent parts in FIGS. 1 to 3. The difference lies in the fact that the clutch member is controlled by a yoke member 58 which is pivoted on the far side of the post 28 by means of an adjustable fulcrum screw 60 which is screwed through the yoke member and has its end lying in a recess 62 in a flange part 64 of the actuator housing. The clutch member is moved by studs 66 on opposite sides of the yoke member, arranged along a diameter of the yoke member so as to apply an appropriately centralized and balanced thrust.

Movement of the yoke member 58 is controlled by a member 68 which is slidably mounted on the post 28 and engages beneath the yoke member, as shown in FIG. 4. This member 68 carries the stop pin 32.

A changeover lever 70 in this case carries a crank 72 with a pin 74 (see FIG. 5) which engages beneath the member 68 so as to move the member 68 up the post 28 when the lever 70 is pressed downwards. It will be seen that upward movement of the member 68 (as viewed in FIG. 4) will result in upward swinging of the yoke member 58 about its far pivot, so that the studs 66 lift the clutch member with a force which is nearly equal to twice the force applied to the member 68.

I claim:

1. An actuator including a clutch member movable between first and second operating positions; an output member drivable by said clutch member; a motor-driven rotatable member and a manual drive member; means to urge said clutch member into said first position, in which position it engages said motor-driven rotatable member; clutch-operating means to move the clutch member from said first position into said second position, in which latter position it engages said manual drive member; and a latch member which is pivotally mounted about an axis substantially parallel to the axis of rotation of said motor-driven member and which is urged into a latching position in which it latches the clutch member in said second position, said latch member being rotated about its pivot axis, when said motor driven member rotates, to allow the clutch member to return to its first position.

2. An actuator as claimed in claim 1, wherein said clutch-operating means includes a thrust member and a stop on said thrust member, said thrust member being arranged to move said clutch member into said second position, in which position said latch member bears against said stop to latch the clutch member in said second position.

3. An actuator as claimed in claim 2, wherein said stop passes through an aperture in the latch member, when the latter is rotated, to allow the clutch member to return to said first position.

4. An actuator as claimed in claim 2, wherein there is provided a yoke member which bears against the clutch member to move the clutch member into said second position, in which the yoke member is pivoted adjacent one end and is engaged by the thrust member at a point adjacent an opposite end, and in which the yoke member acts on said clutch member between said ends.

5. An actuator as claimed in claim 1 wherein teeth are provided on said clutch member, said manual drive member and said motor-driven member, the teeth on said clutch member being selectively engageable with the teeth on said manual drive member or with the teeth on the motor-driven member.